March 17, 1959     A. HALPERN     2,878,252
QUINIDINE GALACTURONATES
Filed April 19, 1957     7 Sheets-Sheet 4
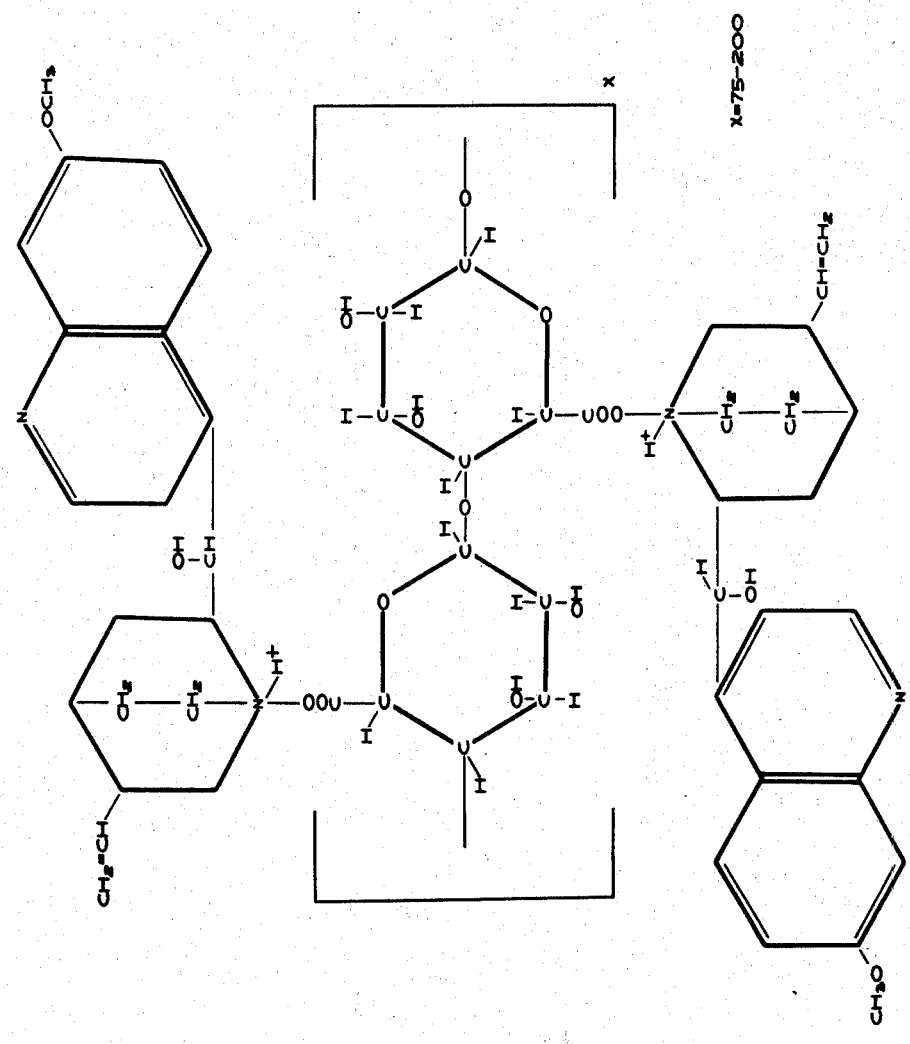
FIG. 4 QUINIDINE POLYGALACTURONATE
INVENTOR.
Alfred Halpern
BY Stanley Walder

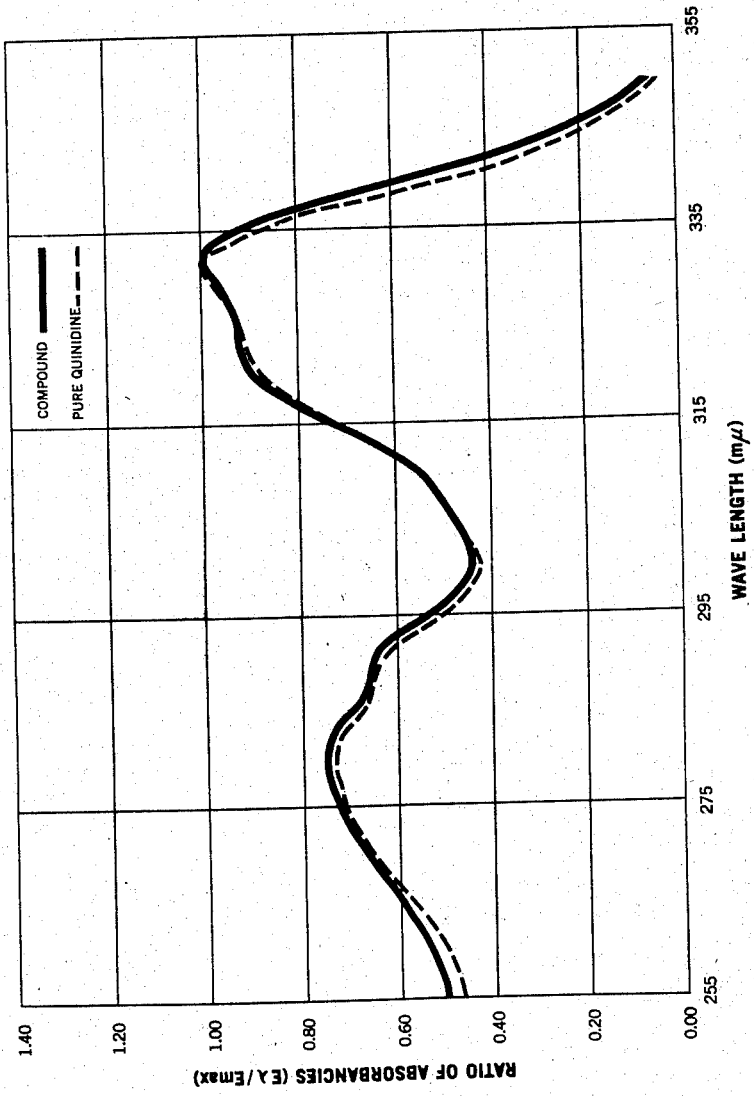

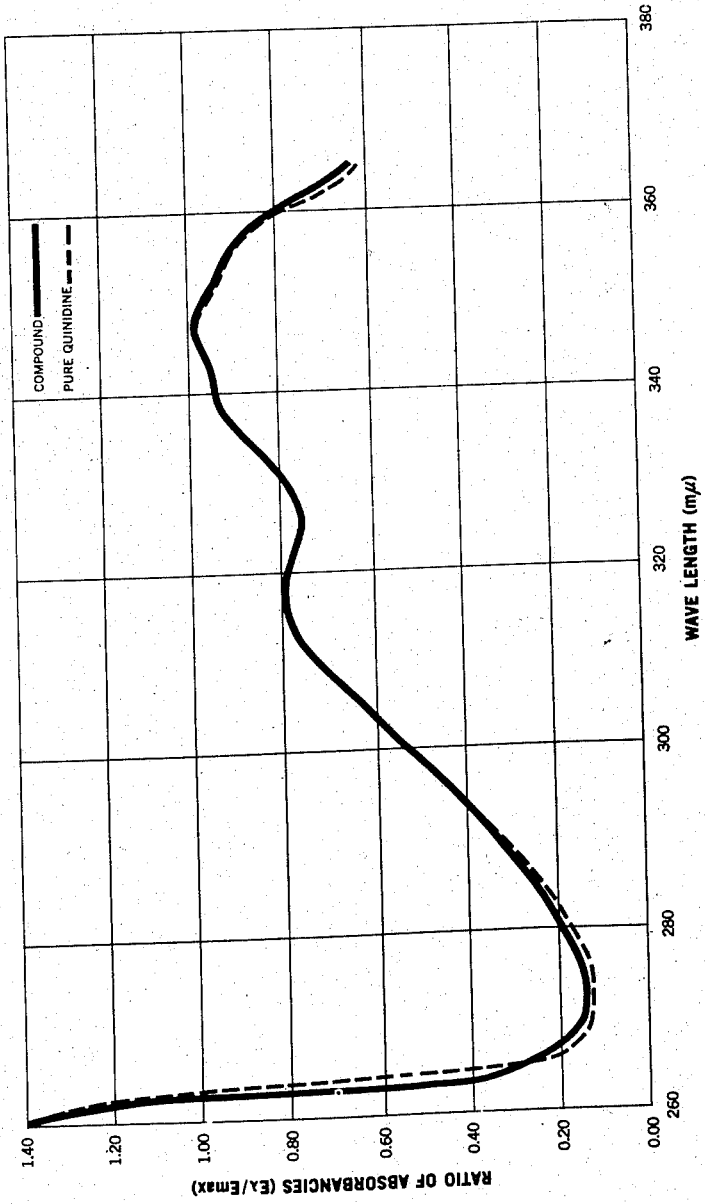
FIG. 2 ULTRAVIOLET ABSORPTION SPECTRA IN 0.1 N HYDROCHLORIC ACID OF QUINIDINE AND OF QUINIDINE POLYGALACTURONATE (COMPOUND)

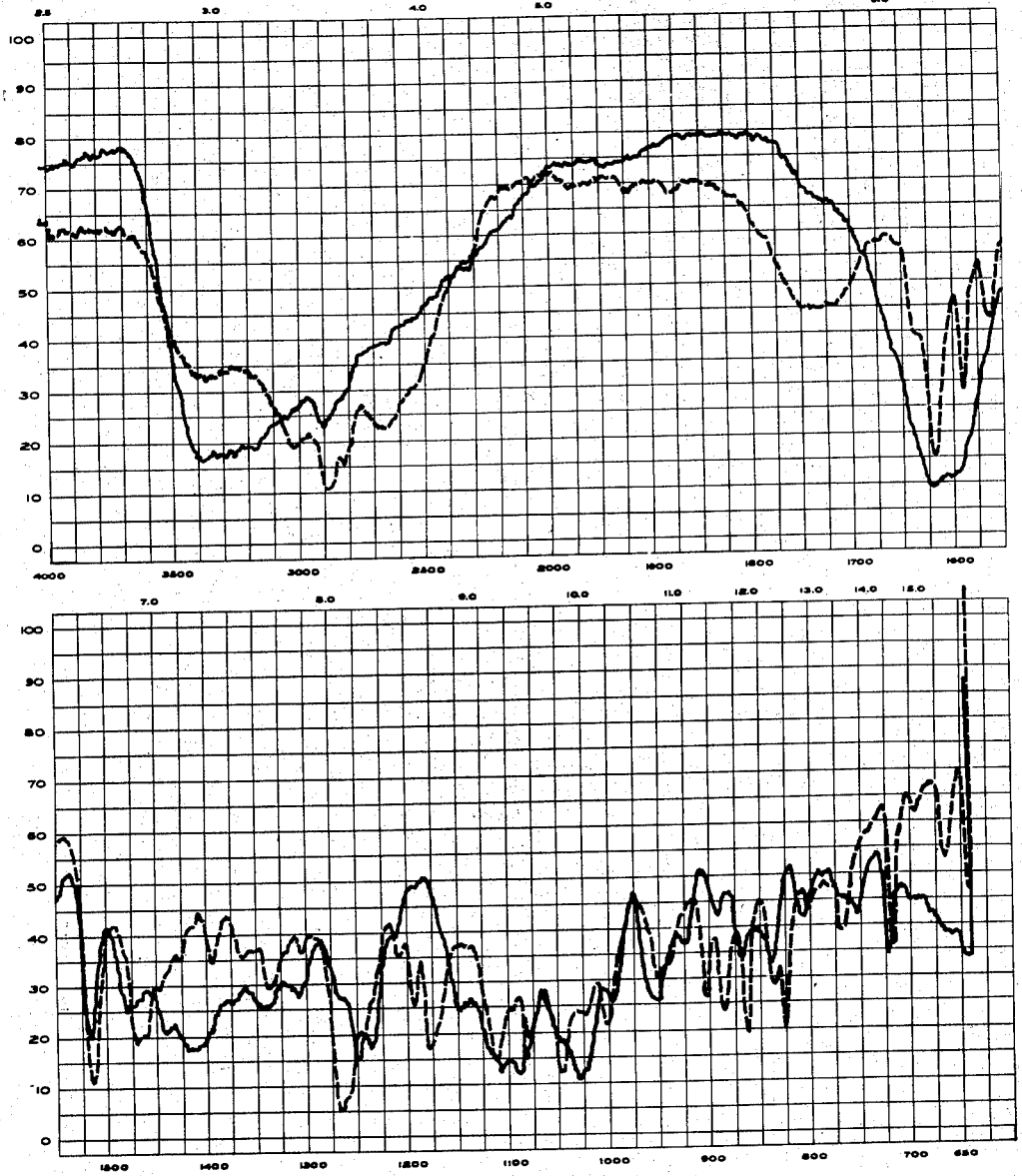
FIG. 3 COMPARISON OF INFRA RED ABSORPTION SPECTRA OF QUINIDINE POLYGALACTURONATE AND A SIMPLE MIXTURE OF QUINIDINE AND POLYGALACTURONATE ACID.

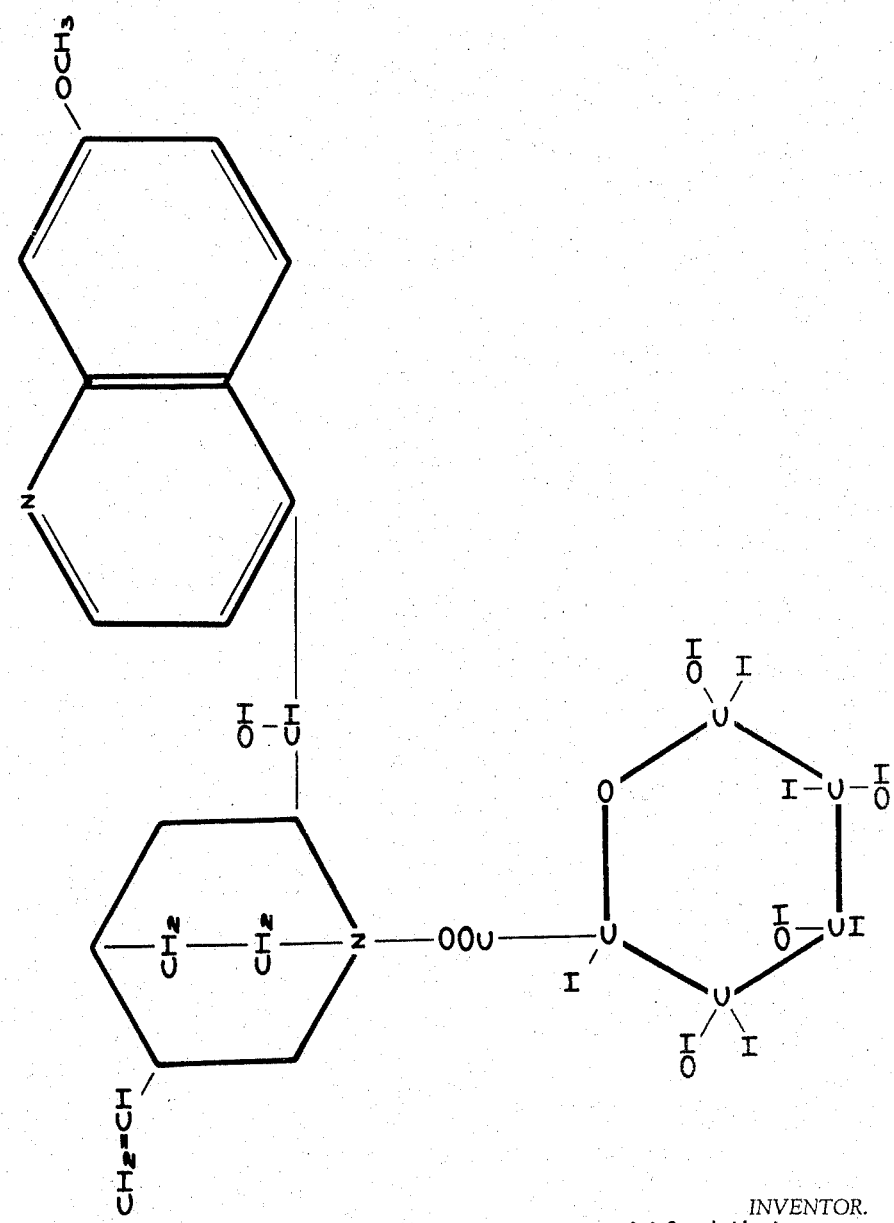

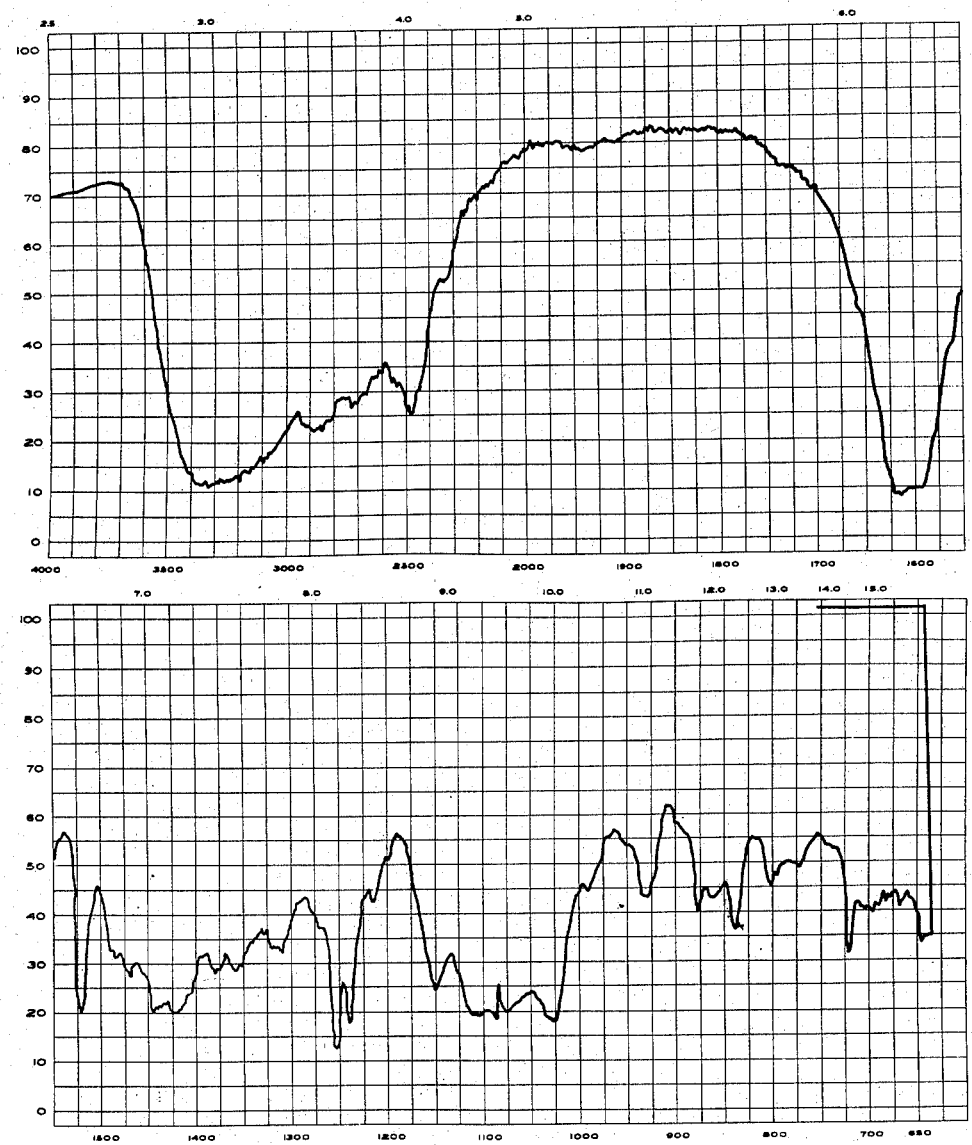
FIG. 6 INFRA-RED ABSORPTION SPECTRUM OF QUINIDINE GALACTURONATE

FIG. 7 —— QUINIDINE POLYGALACTURONATE
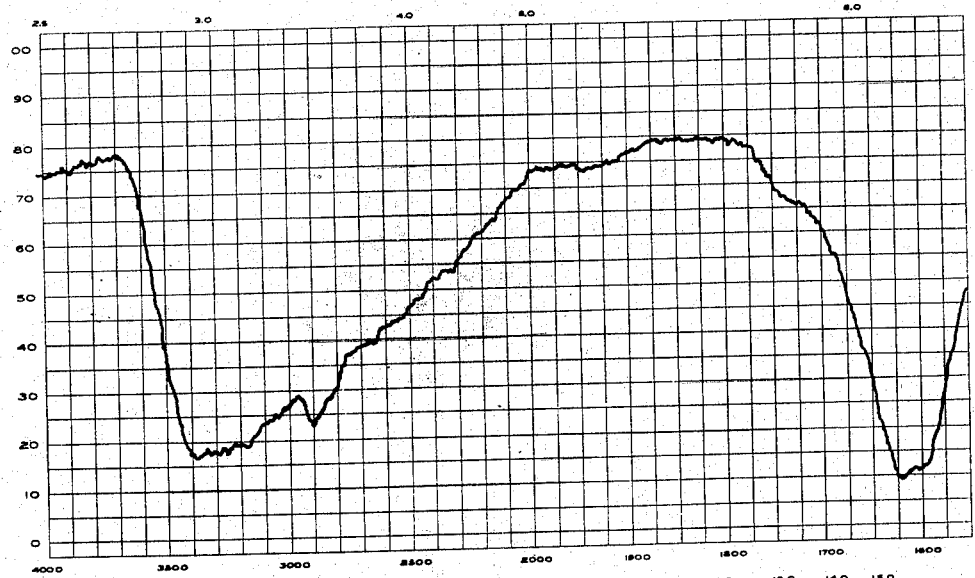
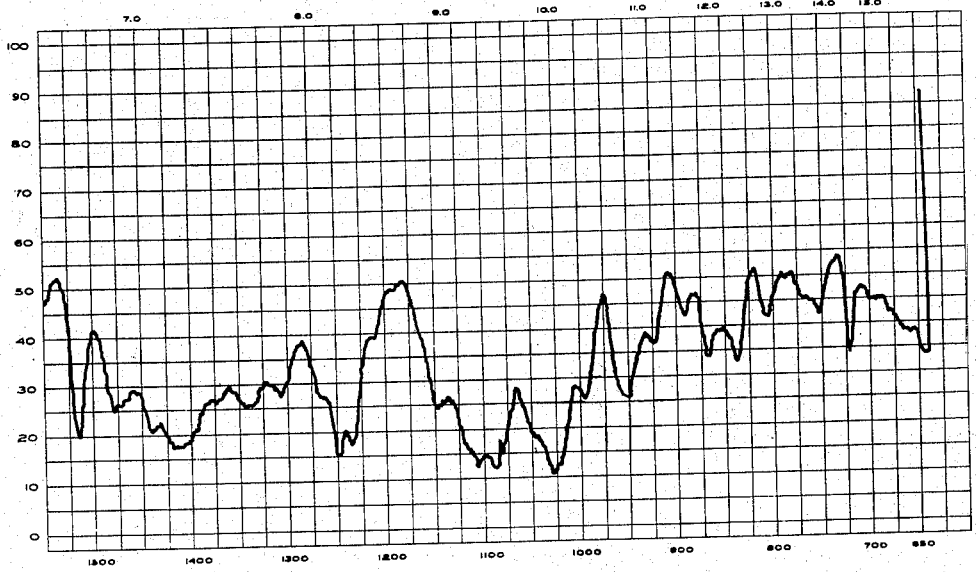

United States Patent Office 2,878,252
Patented Mar. 17, 1959

2,878,252
QUINIDINE GALACTURONATES

Alfred Halpern, Great Neck, N. Y., assignor to Synergistics, Inc., New York, N. Y., a corporation of New York Application April 19, 1957, Serial No. 654,028

9 Claims. (Cl. 260—284)

This invention relates to new therapeutically important derivatives of the alkaloid quinidine which are formed by the interaction of a glycose component and the alkaloidal radical. In particular, this invention is concerned with the polymer, quinidine polygalacturonate, and the monomer, quinidine galacturonate, and methods for their preparation.

Quinidine, an alkaloid obtained from the bark of several species of Cinchona, is used therapeutically to correct, as well as to prevent, certain disorders of the heart rhythm. Quinidine has been called the "broad spectrum drug" for disorders of heart rhythm and is the standard agent with which newer antiarrhythmic drugs are compared.

A fundamental limitation to the use of quinidine in clinical practice is the frequent occurrence of gastrointestinal distress which manifests itself through anorexia, nausea, vomiting and diarrhea. These gastrointestinal disturbances are frequently the result of local irritation due to the quinidine compound used and thereby limit the amount of drug which may be administered.

In order to reduce such local irritation of quinidine and permit a more flexible dosage, several methods have been described. Thus enteric coatings have been employed to permit a selective release of the drug in the intestinal tract and thereby reduce the incidence of nausea and vomiting. Unfortunately, this has no effect on diarrhea. Various inorganic and organic derivatives of quinidine have been prepared in order to circumvent local irritation. Generally these have not altered the incidence of the toxic manifestations to any significant degree. The rationale for the preparation of such inorganic and organic compounds has been to increase their aqueous solubility and thus effect removal of the quinidine compound from the gastrointestinal tract by a more rapid absorption. Frequently, this results in an opposite effect since it produces a high concentration of irritating ions capable of exerting their full noxious action at one time. Other attempts to control the gastrointestinal side-reactions have concerned themselves with the administration of paregoric, the selective administration of the drug with meals, and the concomitant administration of protective gastrointestinal coating agents such as milk of bismuth.

When quinidine galacturonate and quinidine polygalacturonate are used, gastrointestinal distress is virtually eliminated. It is found that the combination of the glycose component with the quinidine alkaloid forms distinct compounds which afford the full therapeutic effect of the quinidine without causing noxious locally irritant side reactions.

Fig. 1 is a graph portraying the ultraviolet absorption spectra in methanol of quinidine and of quinidine polygalacturonate.

Fig. 2 is the ultraviolet absorption spectra in 0.1 hydrochloric acid of quinidine and of quinidine polygalacturonate.

Fig. 3 is a comparison of the infra red absorption spectra of quinidine polygalacturonate and a simple mixture of quinidine and polygalacturonate acid.

Fig. 4 is a structural diagram of quinidine polygalacturonate.

Fig. 5 is a structural diagram of quinidine galacturonate.

Fig. 6 is the infra red absorption spectra of quinidine galacturonate.

Fig. 7 is the infra red absorption spectra of quinidine polygalacturonate.

The compound, quinidine polygalacturonate, is obtained as a creamy white or tannish-white substance which melts with decomposition at 180° C. The empirical formula for quinidine polygalacturonate is $(C_{26}H_{34}O_9N_2)_x$ where X usually extends from 100 to 400 but may be less or greater dependent upon the particular chain length of the polygalacturonic acid employed in the synthesis. For example, when the polygalacturonic acid has an average molecular weight of 65,000, X equals 150, and the compound resulting, analyzes for 57.9 percent carbon, 6.51 percent hydrogen and 5.14 percent nitrogen (calculated carbon 58.18%, hydrogen 6.76% and nitrogen 5.22%) and contains 59.6 percent of quinidine (calculated 60.8%).

Quinidine polygalacturonate is essentially insoluble in water, methanol, ethanol, acetone and ether. The aqueous solubility of this compound is 17 mgms. per 100 mls. of distilled water at 25° C. An analysis of the saturated aqueous solution indicated that it contains 10.22 mgms. of quinidine per 100 mls. of solution, establishing that the compound dissolves as a unit and that the components do not dissolve separately as would a simple mixture.

When dissolved in strong acid, a precipitate of polygalacturonic acid is obtained, whereas strong alkaline media decomposes the compound to liberate the free quinidine base. Over the pH range of pH 4 to pH 6, the compound is completely soluble in water.

The ultraviolet spectrum (Figs. 1 and 2) is characteristic for the absorption range of quinidine alkaloid which is the only portion of the molecule absorbing ultraviolet light, thus establishing the presence of this moiety in the compound. The absorption maxima at a wavelength of 315 and 348 millimicrons was obtained for both the pure alkaloid and the quinidine polygalacturonate. The infrared absorption spectrum of the compound (Fig. 7) is unique, and differs from that obtained with a simple mixture of the two components (see Fig. 3).

In contrast to the markedly bitter taste of the conventional quinidine salts, quinidine polygalacturonate is virtually tasteless. This property permits its use in uncoated tablets, as well as in liquid oral preparations.

Polygalacturonic acid is a polymeric glycose compound of varying chain length, ranging in molecular weight from 40,000 to 80,000 and is obtained from pectic substances. This chain consists of units of galacturonic acid and consequently, the quinidine polygalacturonate has the postulated structural formula as depicted in Figure 4.

To prepare quinidine polygalacturonate it is desirable to first determine the combining power (or neutralization equivalent) of the polymeric acid in order that an approximation of its chemical reaction equivalence be established. When the polymeric acid component is caused to react with a stoichiometric equivalent of quinidine, the desired compound is obtained. The course of the reaction may be followed by determining the change in the pH, since the completed reaction has a neutral pH. The insoluble material may be readily, and completely separated by filtration and purified through repetitive solvent extraction. Quinidine polygalacturonate is stable at both room and elevated temperatures, although it is capable of forming a hydrate, as evidenced by the loss of from 5 to 15 percent of weight on drying at 105° C. for 2 to 4 hours.

The compound may also be formed through the interaction of a metallic salt (such as sodium, potassium, calcium or aluminum), of the polygalacturonic acid, with an acid salt of the quinidine (such as sulfate, chloride, bromide or nitrate). The double decomposition effected by this reaction results in the formation of quinidine polygalacturonate.

The monomeric compound, quinidine galacturonate, may be prepared through the inter-reaction of quinidine and galacturonic acid in alcoholic or hydro-alcoholic media. This resultant quinidine glycoside is soluble in water and alcoholic solutions, but is insoluble in ether, chloroform and dioxane. Quinidine galacturonate is obtained as a white to tannish-white crystalline material which melts at 125° C., with decomposition, and has a characteristic bitter taste. A one percent solution of the compound in water, has a pH of 5.75, and it is decomposed by excess acid or alkali. The compound has an empiric formula of $C_{26}H_{34}O_9N_2$ and analyzes to contain 57.9 percent carbon, 6.79 percent hydrogen and 5.1 percent nitrogen (calculated carbon 58.18%, hydrogen 6.76% and nitrogen 5.22%). The compound contains one molecule of water of crystallization. The chemical structure of quinidine galacturonate, may be postulated to be as shown in Fig. 5.

The molecular weight of this compound, determined by the conventional camphor technique, is in agreement with the calculated value of 536 (monohydrate) (found: 510, 521).

The aqueous solubility of quinidine galacturonate is 0.65 gram in one milliliter of water at 25° C. The solution is stable and may be utilized for the preparation of solutions for injectable use. The ultraviolet absorption spectrum of quinidine galacturonate is typical for the alkaloid, with maxima at the wavelengths of 318 millimicrons and 348 millimicrons. These absorption maxima are characteristic for the quinidine molecule.

The infrared absorption spectrum for quinidine galacturonate (see Fig. 6), is characteristic for the compound and differs from that of either the individual components or their mixture.

When quinidine polygalacturonate or quinidine galacturonate are administered to animals or humans, it produces the full cardiotonic effects which quinidine compounds such as quinidine sulfate and quinidine gluconate produce. Thus, these new derivatives of quinidine will prolong the refractory time of heart muscle by as much as 100 percent under appropriate dosage administration. The conduction through heart muscle is slowed and the QRS interval of the electrocardiogram is prolonged. A concomitant prolongation of the auricular-ventricular conduction (P-R interval) is observed.

Quinidine polygalacturonate and quinidine galacturonate have an anti-fibrillatory action on the heart of man and animals. If a tetanizing current of sufficient intensity is applied to the heart, fibrillation results. After administration of these quinidine compounds, the intensity of the stimulation required to send the heart into fibrillation is increased.

In addition to described direct actions on the electrical conductivity of the heart, quinidine galacturonate and the polygalacturonate reduce the contractile force of heart muscle. This may be observed in experiments with isolated strips of heart muscle as well as in experiments with the intact heart of animals. These new compounds of quinidine also block the vagus nerve in its control of the heart, as well as to exert the full action of quinidine alkaloid on peripheral cardiovascular structures.

The following examples illustrate the methods of producing the new compounds and their identity.

*Example 1.*—One hundred grams of polygalacturonic acid are dissolved in one liter of a sixty percent (vol./vol.) mixture of methanol and water. The neutralization equivalent of the polygalacturonic acid is determined by titration with tenth-normal alkali on an aliquot sample. A stoichiometric equivalent of quinidine alkaloid dissolved in 2,500 cc. of eighty percent methanol is slowly added, with continued stirring.

The pH of the reaction mixture is taken both before and after the addition of the last portion of the quinidine-methanol solution. The mixture is gently warmed (30° to 50° C.), and the pH determined at twenty minute intervals. At the end of four hours, or when the reaction has gone to completion as evidenced by the pH of the mixture (between pH 6.5 and pH 7.5), the stirring is then stopped and the mixture cooled to 0° C. and filtered. The solvent is evaporated to dryness under reduced pressure, utilizing as little heat as is feasible. The dried residue is powdered and suspended in ten volumes of methanol and filtered. The insoluble powder is dried, and is quinidine polygalacturonate, melting at 180° C. with decomposition. The ultraviolet spectrum confirms the presence of quinidine (Fig. 1) in the molecule and the infrared spectrum is characteristic for the compound (Fig. 7). The carbon, hydrogen and nitrogen analyses agree with the calculated values for the empiric formula $(C_{26}H_{34}O_9N_2)_x$. (Calculated: carbon, 58.18%, hydrogen, 6.76% and nitrogen, 5.22%. Found: carbon, 57.9%, hydrogen, 6.51% and nitrogen 5.14%.)

The dry compound is practically tasteless and virtually without odor. It is stable at room, as well as at elevated temperatures. This material is sufficiently pure to be used in the compounding of tablets or in pharmaceutical preparations, such as capsules and liquid suspensions, manufactured by any of the processes well known to the art. It has the advantage over the conventional inorganic quinidine compounds of permitting oral administration without the use of flavoring, masking or coating agents, since the bitter nauseous taste has been eliminated. When administered to humans or animals, the resultant compound causes the full pharmacologic and therapeutic action of quinidine on the heart and cardiovascular system.

*Example 2.*—Another method of producing quinidine polygalacturonate is to reduce the reaction-mixture to a slurry, under reduced pressure, after the reaction has progressed to completion as determined by the pH (as noted in Example 1, above). Three volumes of acetone are then added and the mixture chilled for four hours in an ice chest, and filtered. The filtered material is washed with two 100 cc. portions of methanol, followed by a 150 cc. portion of acetone, and the powder dried at 100° C. The dried powder conforms, in every way, with that obtained as a result of Example 1, above.

*Example 3.*—One hundred grams of polygalacturonic acid are suspended in three liters of sixty percent methanol water mixture and is neutralized with exactly one gram-molecular equivalent weight of sodium hydroxide dissolved in 100 cc. methanol. To this is added a solution of one gram molecular equivalent weight of quinidine sulfate dissolved in 500 cc. of methanol. The mixture is warmed to reflux temperature and heated for a period of two hours. The solvent is then evaporated to dryness under reduced pressure and powder washed with three 400 cc. portions of hot distilled water, followed by three 100 cc. portions of methanol and dried. The resultant quinidine polygalacturonate is equivalent in physical, chemical, pharmacologic and therapeutic properties to the material obtained as a result of the process described in Example 1, above.

*Example 4.*—In place of the methanol used as a solvent in Examples 1, 2 and 3 there may be substituted an alcohol of the general class ROH, where R may consist of an alkyl or iso-alkyl group containing from two to five carbons.

*Example 5.*—In place of the sodium hydroxide used to neutralize the pectinic acid in Example 3, above, there may be substituted any hydroxide, carbonate or bi-carbonate of a metal, up to the molecular weight of fifty-five. The other steps of the process are carried out exactly as described in Example 3, above.

*Example 6.*—In place of quinidine sulfate utilized in the reaction described in Example 3, above, there may be substituted any of the inorganic or organic acid salts of quinidine, which are capable of entering into the double decomposition reaction in hydroalcoholic or alcoholic medium. The other steps in the process are identical to those described in Example 3, above.

*Example 7.*—One-tenth mole of galacturonic acid is dissolved in 500 cc. of methanol, and to it is added a solution of one-tenth mole of quinidine base dissolved in one liter of methanol. The mixture is heated to reflux for a period of four hours and then the solvent is evaporated to dryness. The creamy-white crystalline material remaining is purified by crystallization from ninety-five percent ethanol, using a ratio of ten volumes of ethanol for each gram of quinidine galacturonate. The quinidine galacturonate melts at 125° C. with decomposition, and analyzes for carbon, oxygen, hydrogen and nitrogen in agreement with the theoretical values for this material ($C_{26}H_{34}O_9N_2$). (Found: carbon 57.9%, hydrogen, 6.79% and nitrogen 5.1%.)

*Example 8.*—One-tenth mole of sodium galacturonate is dissolved in 500 cc. of distilled water to which is added one-tenth mole of quinidine sulfate dissolved in 500 cc. of distilled water. The mixture is stirred for four hours and evaporated to dryness. A water-bath, or reduced pressure may be used for the evaporation step. The dried powder is pulverized and dissolved in sufficient hot ethanol to just dissolve the compound, and filtered. The hot ethanol solution is set aside overnight in an ice chest, whereupon quinidine galacturonate separates as a white powder. The compound obtained in this manner is identical in physical, chemical, pharmacologic and therapeutic properties to that obtained in Example 7, above.

The sodium salt of galacturonic acid (used above), may also be prepared during the course of the reaction by first neutralizing (or titrating) the galacturonic acid solution prior to the addition of the quinidine sulfate. When this procedure is utilized, a tenth normal solution of the alkali hydroxide, carbonate or bi-carbonate is preferred, although stronger (or weaker) concentrations may be used. The choice of concentration of neutralizing solution are dependent upon the reaction volumes, as well as the particular preferences of the technician.

*Example 9.*—In place of the sodium galacturonate utilized in Example 8 for the preparation of quinidine galacturonate, there may be substituted any metallic salt of galacturonic acid, capable of entering into a double decomposition reaction with a quinidine salt. The quantities of these galacturonic acid metal salts which are used are stoichiometric gram molecular equivalents. The other steps, in carrying out the reaction, are identical to those described in Example 8, above, and the product obtained conforms in every way to that resulting from the procedures described in Example 8.

*Example 10.*—In place of quinidine sulfate utilized in the reaction described in Example 8, there may be substituted any of the inorganic or organic acid salts of quinidine, which are capable of entering into the double decomposition reaction in hydroalcoholic or alcoholic medium. The other steps in the process are identical to those described in Example 8, above.

In practice, when quinidine polygalacturonate and quinidine galacturonate are used to correct certain cardiac disorders, they are most often administered in the form of tablets or capsules, although the unique solubility of the quinidine galacturonate makes it especially desirable for parenteral use.

Quinidine polygalacturonate may be readily compressed into tablets or filled into capsules, utilizing conventional procedures. It is compatible with the ordinary agents used to prepare x pharamaceutically acceptable tablets or capsules such as excipients, granulating agents, binders and lubricants. Because of the lack of gastro-intestinal irritation and the virtually complete absorption from the gastro-intestinal tract, quinidine polygalacturonate is tableted or capsuled so that each tablet or capsule contains 150 milligrams of quinidine polygalacturonate. The preferred dosage is one to two tablets or capsules taken three or four times daily. It is obvious that some individuals may require a larger amount and others a smaller dose or even a more frequent schedule of administration. The use of an uncoated tablet permits a more rapid disintegration in the body fluids with consequent more rapid absorption and pharmacologic action.

The range in dosage for quinidine galacturonate, when administered orally in tablet or capsule form, is from 100 to 200 milligrams (one to two tablets or capsules, each containing 100 milligrams of the compound), three or four times daily. In this instance, as well, the dosage may be altered to meet the individual patient demands.

When it is desired to administer quinidine galacturonate parenterally, 100 grams of quinidine galacturonate are dissolved in 500 cc. of sterile distilled water. Sterile physiologic saline solution may be used in place of the sterile distilled water. The mixture is filtered through a bacteria retentive porcelain filter and filled in 1 cc. hermetically sealed glass containers. Preservatives may be added. The common parenteral dose is from ½ to 1 cc. of the solution injected daily or as required. The injections are, preferably, made intramuscularly, although intravenous injection may also be utilized.

It is not desired to be limited except as set forth in the following claims, the above description being by way of illustration of the invention, and what is claimed is:

1. A compound selected from the group consisting of quinidine galacturonate and quinidine polygalacturonate.
2. Quinidine galacturonate.
3. Quinidine polygalacturonate.
4. A method of preparing quinidine polygalacturonate which consists of dissolving polygalacturonic acid in a hydroalcoholic solvent and mixing the same with a solution of quinidine in a compatible organic solvent to react the two, evaporating the solvent and recovering the dried residue.
5. A method of preparing quinidine polygalacturonate as described in claim 4, in which the recovery of the dried residue is obtained by first reducing the mixture to a slurry, mixing the same with acetone, chilling and then filtering such mixture, and recovering the dried powder from the filtrate.
6. A method of preparing quinidine polygalacturonate which consists of dissolving polygalacturonic acid in a hydro-alcoholic solvent in which the alcohol moiety consists of a lower alcohol selected from the class of alkyl and iso-alkyl groups, containing from two to five carbons, neutralizing the same with exactly one gram molecular equivalent weight of a compound selected from a group consisting of metal hydroxides, carbonates and bi-carbonates up to the molecular weight of 55, and mixing with said solution a solution in one of said lower alcohols of one gram molecular equivalent weight of a compound selected from the group of inorganic and organic acid salts of quinidine which are capable of entering into a double decomposition reaction in the resulting hydroalcoholic medium, evaporating said solvent and recovering the resultant dried powder.
7. A method of preparing quinidine galacturonate which consists of dissolving equimolar quantities of a compound selected from the group consisting of galacturonic acid and its metallic salts and a compound selected from a class consisting of quinidine and its acid salts, in an alcoholic solvent selected from a group of lower alkyl and iso-alkyl alcohols containing from two to five carbons, evaporating the solvent and recovering the dried residue.
8. A method of preparing quinidine galacturonate which consists of dissolving galacturonic acid in a hydro-alcoholic solvent and mixing the same with a solution of quinidine in a compatible organic solvent to react the two, and then recovering the reaction product.

9. A method of preparing quinidine galacturonate which consists of dissolving galacturonic acid in a hydro-alcoholic solvent in which the alcohol moiety consists of a lower alcohol selected from the class of alkyl and iso-alkyl groups, containing from two to five carbons, neutralizing the same with exactly one gram molecular equivalent weight of a compound selected from a group consisting of metal hydroxides, carbonates and bi-carbonates up to the molecular weight of 55, and mixing with said solution a solution in one of said lower alcohols of one gram molecular equivalent weight of a compound selected from the group of inorganic and organic acid salts of quinidine which are capable of entering into a double decomposition reaction in the resulting hydro-alcoholic medium, evaporating said solvent and recovering the resultant dried powder.

References Cited in the file of this patent

Kiliani et al.: Deutsche Chemische Gesellschaft, Berichte, vol. 37, 1200–1203, note 1202 (1904).

Kiliani: Deutsche Chemische Gesellschaft, Berichte, vol. 55, pages 78, 86, 92, 94, 493–496 (1922).

Beilsteins Handbuch der Organischen Chemie, 4th ed., vol. 3–4, page 167, system #248 (1928).